US010316819B2

(12) United States Patent
Edmiston (10) Patent No.: US 10,316,819 B2
(45) Date of Patent: Jun. 11, 2019

(54) ANY AXIS TURBINE PINWHEEL AND METHOD OF CONSTRUCTION

(71) Applicant: Daniel Edmiston, Brookfield, MO (US)

(72) Inventor: Daniel Edmiston, Brookfield, MO (US)

( * ) Notice: Subject to any disclaimer, the term of this patent is extended or adjusted under 35 U.S.C. 154(b) by 285 days.

(21) Appl. No.: 15/283,158

(22) Filed: Sep. 30, 2016

(65) Prior Publication Data

US 2018/0094618 A1 Apr. 5, 2018

(51) Int. Cl.
*F03D 3/00* (2006.01)
*F03D 3/06* (2006.01)

(52) U.S. Cl.
CPC ............. *F03D 3/005* (2013.01); *F03D 3/061* (2013.01); *F03D 3/065* (2013.01); *Y02E 10/74* (2013.01)

(58) Field of Classification Search
CPC . F03D 3/005; F03D 3/06; F03D 3/061; F03D 3/065; Y02E 10/74
See application file for complete search history.

(56) References Cited

U.S. PATENT DOCUMENTS

| 6,428,275 | B1 * | 8/2002 | Jaakkola | F03D 3/005 416/176 |
| 9,797,373 | B2 * | 10/2017 | Aihara | F03D 3/061 |
| 2006/0275105 | A1 * | 12/2006 | Roberts | F03D 3/061 415/4.2 |
| 2011/0097200 | A1 * | 4/2011 | Tai | F03D 3/02 415/199.3 |
| 2012/0183407 | A1 * | 7/2012 | Vallejo | F03D 3/061 416/228 |

* cited by examiner

*Primary Examiner* — Ryan A Reis (57) ABSTRACT

A turbine pinwheel has blades mounted with the outer edges curved to respond to the wind transverse to the axis like a vertical axis turbine while the blades inner edges are twisted to respond to the wind parallel to the axis like a horizontal axis turbine. With two rotor subassemblies mounted on the same shaft the pinwheel spins the same direction regardless of the direction of the wind in relation to the pinwheel axis. Each rotor subassembly may be made from a single sheet of material cut to a specific shape and formed to create the pinwheel blades and blade supports.

3 Claims, 9 Drawing Sheets

ANY AXIS TURBINE PINWHEEL AND METHOD OF CONSTRUCTION

CROSS-REFERENCE TO RELATED APPLICATIONS

This application claims the benefit of provisional patent application Ser. No. 62/284,543, filed Oct. 2, 2015 by the present inventor.

FEDERALLY SPONSORED RESEARCH

Not applicable

SEQUENCE LISTING OR PROGRAM

Not applicable

BACKGROUND

Field

This application relates to a pinwheel and method of construction, specifically to a pinwheel with an improved design allowing for a more versatile appearance and function.

Discussion of Prior Art

Traditionally pinwheels are horizontal axis wind turbines. For the pinwheel to spin at its intended speed it must be aimed into the wind. As the wind shifts pinwheels must be constantly reoriented to maintain rotational speed which may diminish the enjoyment of its use.

Vertical axis wind turbines do not need to be constantly reoriented with shifting winds however the need for large or more complex blade supports makes it difficult to use their design for making commercially successful pinwheels.

Advantages

From a consideration of the ensuing description and accompanying drawings, a more versatile pinwheel which mitigates or obviates the aforementioned problems will become apparent.

SUMMARY

The invention provides a method for constructing an inexpensive pinwheel that will spin regardless of the direction of the wind relative to its axis.

Utilizing two sheets of a flat material a fuller three dimensional shaped pinwheel may be formed resembling familiar objects such as a baseball, a football, an egg, a hot air balloon, and etcetera.

LIST OF REFERENCE NUMERALS

110 Rotor subassembly
110T Top rotor subassembly
110B Bottom rotor subassembly
112 Array of blades
112T Array of blades (subassembly 110T)
112B Array of blades (subassembly 110B)
114 Small radius blade support
114T Small radius blade support (subassembly 110T)
114B Small radius blade support (subassembly 110B)
115 outer edge (small radius blade support)
116T Bushing (subassembly 110T)
116B Bushing (subassembly 110B)
118 Large radius blade support
118T Large radius blade support (subassembly 110T)
118B Large radius blade support (subassembly 110B)
118S Large radius blade support segment
119 Outer edge (large radius blade support)
120 Barbed retainer
122 Shaft
124 Rod
210 Single blade element
211 Outer edge (of single blade element)
212 Outer blade section
213 Large radius edge (of single blade element)
214 Arc (of outer blade section)
215 Central angle (of outer blade section arc)
216 Inner blade section
217 Inner edge (of single blade element)
219 Small radius edge (of single blade element)
221 Twist angle (of inner blade section)
223 Tilt angle (of the inner blade section)
310 Pinwheel template
312 Fold lines
314 Alignment and attachment point
316 Center reference point
318 Attachment tab
320 Corresponding connection points (outer blade section arc)
321 Separation angle (alignment and attachment points on 118S)
322 Transition section (single blade element 210)
325 Eyelet
900 Additional section

DETAILED DESCRIPTION

First Embodiment—FIGS. 1-2A-2B

Figure 1:
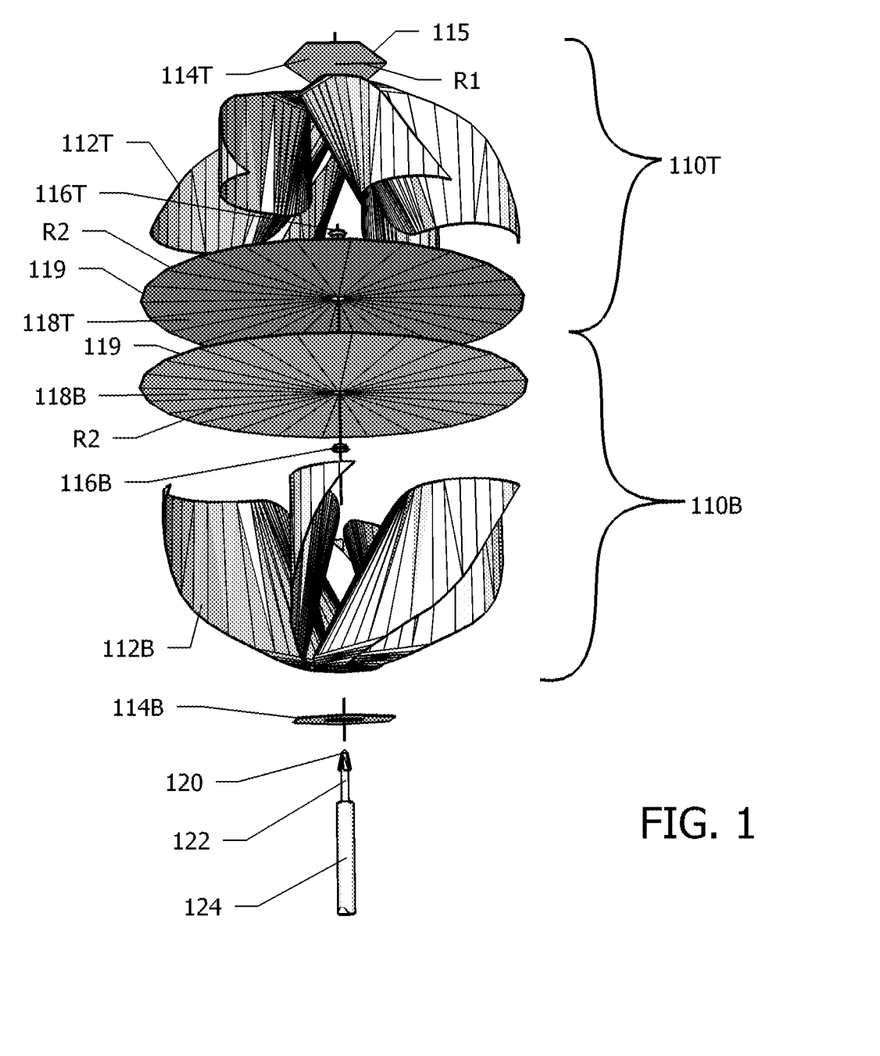
FIG. 1 is an exploded view of a first embodiment of the invention.

FIG. 1 illustrates an exploded view of one version of the Any Axis Turbine Pinwheel.

Although the pinwheel can be operated with its axis in any orientation the following description refers the pinwheel being oriented, as illustrated in FIG. 1, with axis being vertical and supported from the bottom.

The rotor, turbine, or pinwheel has a top rotor subassembly 110T, and a bottom rotor subassembly 110B. Each rotor subassembly 110 has an array of blades 112 kept in place by a small radius blade support 114, and a large radius blade support 118. The small radius blade support 114 has the form of a flat hexagon shape, perpendicular to the axis, with a radius R1 and six outer edges 115. The large radius blade support 118 has the form of a flat disc, perpendicular to the axis, with a radius R2 and an outer edge 119.

The pinwheel support is a rod 124 which has a shaft 122 extending axially from the top of the rod 124. The tip of the shaft 122 has a barbed retainer 120.

Figure 2A:
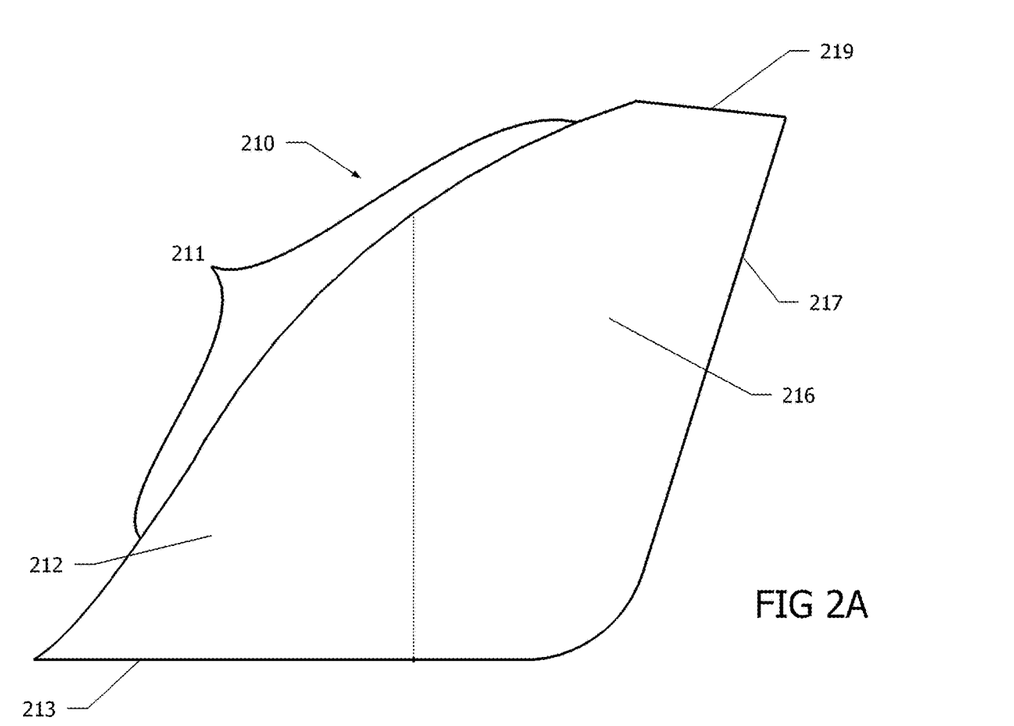
FIG. 2A is a template of a single blade before forming. (1$^{st}$ embodiment)

FIG. 2A is a template of a single blade element 210 of the array of blades 112, of FIG. 1, before being formed. An outer edge 211 is defined by the points, perpendicular to the pinwheel axis, most distant from the axis once the blade is formed. A large radius edge 213 is provided for attachment to the large radius blade support 118 of FIG. 1. An inner edge 217 is defined by the points, perpendicular to the axis, closest to the axis once the blades are formed. A small radius edge 219 is provided for attachment to the small radius blade support 114 of FIG. 1. The single blade element 210 has an outer blade section 212 and an inner blade section 216 with each section to be formed into shapes distinct from each other.

Figure 2B:
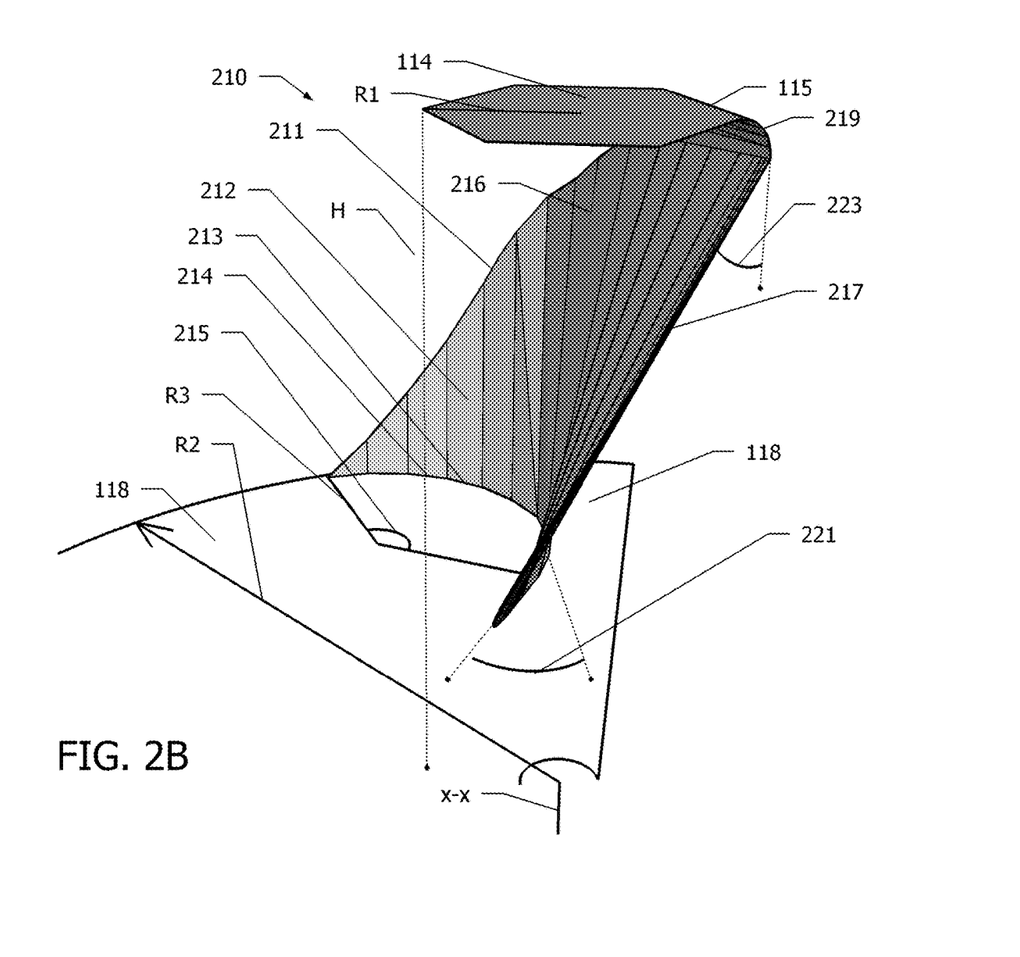
FIG. 2B is a perspective view of a single blade after forming. (1$^{st}$ embodiment)

FIG. 2B is a perspective view of a formed single blade element 210 which illustrates the outer blade section 212 having a bend radius R3 forming an arc 214, and illustrates the inner blade section 216 which has a twist angle 221 and a tilt angle 223. FIG. 2B also illustrates the axis x-x, the large radius blade support 118, with its outer edge 119 and radius R2, and illustrates the small radius blade support 114 with its outer edge 115. A height H of the single blade element 210 is defined by the distance between the small radius blade support 114 and the large radius blade support 118.

The single blade element's 210 outer blade section 212 is curved forming an arc 214 on the large radius blade support 118 with the outer blade section's 212 large radius edge 213. The arc 214 has a radius R3 and a central angle 215. The arc 214 starts at the large radius blade support's 118 outer edge 119 and is tangent to the outer edge 119. The arc 214 has a central angle 215 of 145 degrees. The ratio of the large radius blade support's 118 radius R2 to the outer blade section's 212 arc's radius R3 is 3 to 1. The single blade element's 210 outer blade section 212 is attached to the large radius blade support 118 and is perpendicular to the large radius blade support 118.

The single blade element's 210 inner blade section's 216 large radius edge 213 is attached to the large radius blade support 118 such that its large radius edge 213 is linear and is tangent to the inner edge of the arc 212. The inner blade section's 216 small radius edge 219 is attached to one outer edge 115 of the small radius blade support 114 such that inner edge 217 of the single blade element 210 tilts away from the axis at the small radius edge 213 of the inner blade section 216. The tilt angle 223 of the outer edge 217 also forms a twist of the inner blade section 217 with a twist angle 221.

Referring to FIG. 1, the top rotor subassembly 110T is formed by the array of blades 112T having six single blade elements 210 equally spaced around, and attached to, the large radius blade support 118T. Also attached to the large radius blade support 118T is a bushing located at its center. At the top of the array of blades 112T, opposite the large radius blade support 118T, the small radius blade support 114T is attached to the array of blades 112T.

The bottom rotor subassembly 110B is a mirror image, along the axis, of the top rotor subassembly 110T except for being rotated 30 degrees, about the axis, and having a hole at the center of the small radius blade support 114B allowing passage of the support rod 124.

The two rotor subassemblies 110T and 110B are united by attachment of their two large radius blade supports 118T and 118B to each other such that their bushings 116T and 116B align with the axis.

The pinwheel support rod 124 inserted through the hole in the small radius blade support 114B allows the shaft 122 to pass through the two bushings 116T and 116B facilitating rotation of the pinwheel. The barbed retainer 120 retains the bushing 116T on the shaft 122 while allowing the pinwheel to rotate about the shaft 122.

Values Table (First Embodiment)

H Height of rotor subassembly 110
R1 Radius of Small radius blade support 114
R2 Radius of Large radius blade support 118
R3 Radius of Arc (of outer blade section) 214
Ratio of H/R2=1/1
Ratio of R1/R2=1/5
Ratio of R2/R3=1/3
Central angle 215=135 degrees
Twist angle 221=40 degrees
Tilt angle 223=20 degrees Operation All outer blade sections 212 of the pinwheel are curved in the same direction and are parallel to the axis, much like those of some vertical axis turbines, which cause the pinwheel to spin when the wind is from any side of the pinwheel perpendicular to the axis.

The inner blade sections 216 of the array of blades 112T, of the top rotor subassembly 110T, have a twist angle 221 and a tilt angle 223 which cause the pinwheel to spin the same direction when wind is from the top of the pinwheel, inline with the axis. The bottom rotor subassembly B110 is shielded from the wind by the two large radius blade supports 118T and 118B.

Since the bottom rotor subassembly 110B is a mirror image of the top rotor subassembly 110T, the inner blade sections 216 of the array of blades 112B twist and tilt opposite of the direction of the inner blade sections 216 of the array of blades 112T in the top subassembly 110T. Because of this opposite twist and tilt and the shielding effect of the large radius blade supports 118T and 118B, when the wind is from the bottom of the pinwheel it will spin the same direction as when the wind is from the top of the pinwheel.

These features working together keep the pinwheel spinning the same direction when the wind is blowing regardless of shifts in the wind direction or changes to the orientation of the pinwheel's supporting rod 124.

The outer edge 211 of each single blade element 210 follows a curve such that when the pinwheel is spinning the arrays of blades 112T and 112B create a 3D profile of a sphere giving the pinwheel a substantially full ball appearance.

Figure 3A:
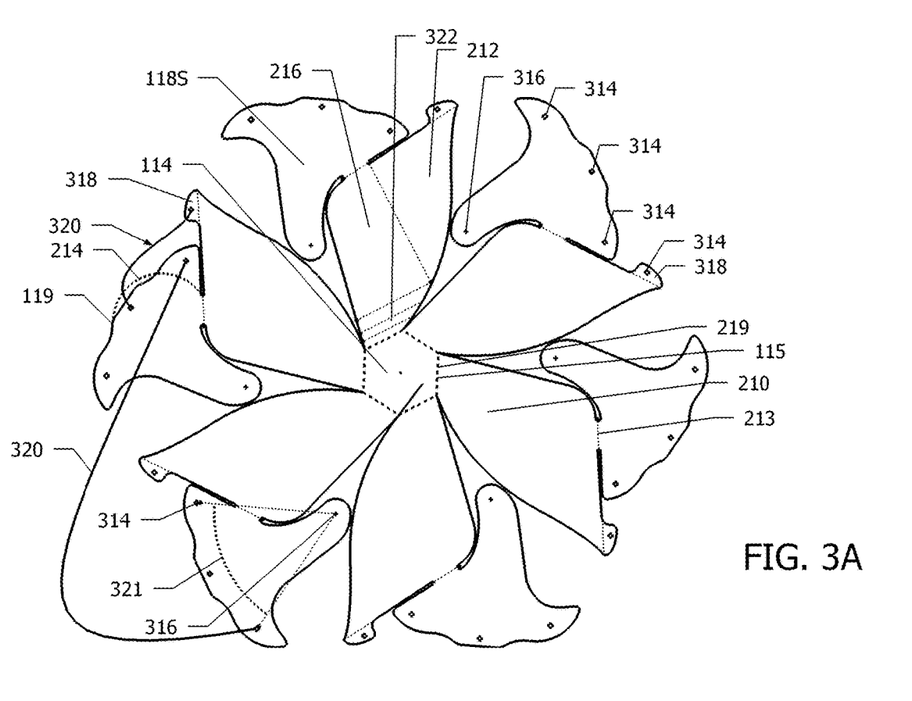
FIG. 3A is a template for construction.
Figure 3B:
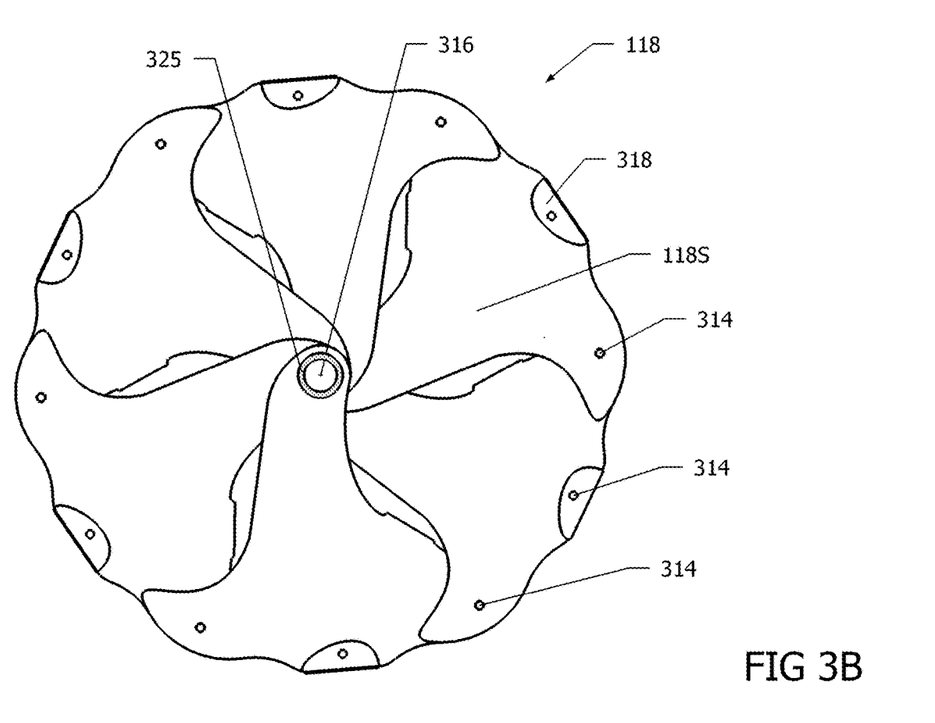
FIG. 3B is a bottom view of a large radius blade support formed from the template of FIG. 3A.
Figure 3C:
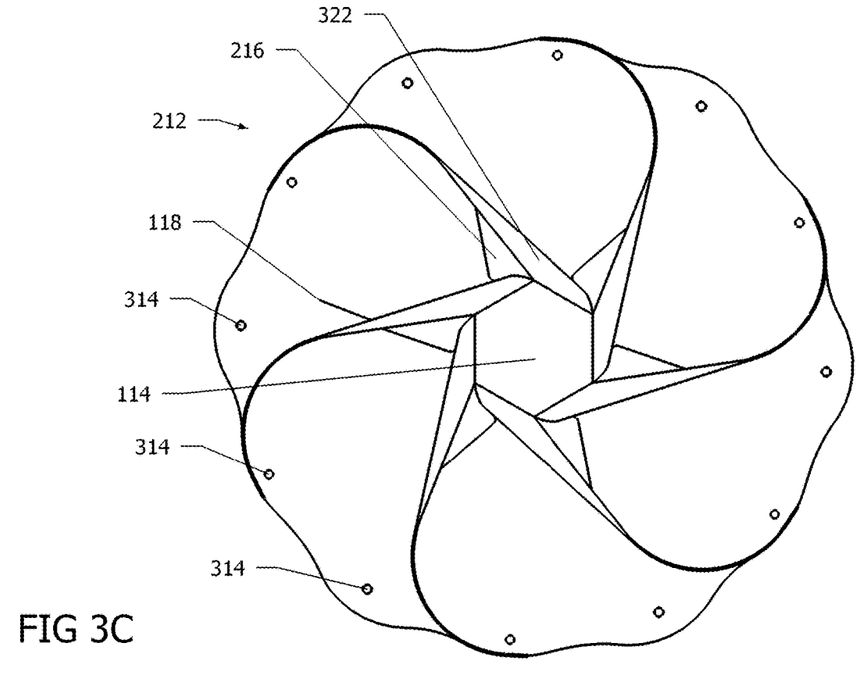
FIG. 3C is a top view of a top rotor subassembly 110T formed from the template of FIG. 3A.

Construction Method—FIGS. 3A-3B (FIGS. 1-2A-2B)

The following, details a method of constructing the pinwheel of the first embodiment where each rotor subassembly 110 is substantially constructed from one sheet of a suitable material.

FIG. 3A is a pinwheel template 310 of a thin sheet of material for forming a rotor subassembly 110 as illustrated in FIG. 1.

At the center of the pinwheel template is the hexagon shaped small radius blade support 114. Extending outward from each outer edge 115 of the small radius blade support 114 is a single blade element 210 with its small radius edge 219 in common with the outer edge 115.

A large radius blade support segment 118S extends outward from the large radius edge 213 of each single blade element 210. Also extending from the large radius edge 213 of each single blade element 114 is an attachment tab 318. The large radius blade support segment 118S has a center reference point 316, and three alignment and attachment points 314 each with an equal distance R2 from the center reference point 316 with a separation angle 321 of 30 degrees. The attachment tab 318 also has an alignment and attachment point 314.

Construction

A rotor subassembly 110T is constructed from the template 310 by forming the outer blade section 212 of each single blade element 210 and then connecting the large radius blade support segments 118 to each other at the center reference point 316 and at the corresponding connection points 320. This action will twist and tilt the inner blade sections 216 to its intended positions and form the large radius blade support 118.

Each attachment tab 318 and each large radius blade support segments 118S are folded up 90 degrees along the large radius edge 213 of each single blade element 210. Each tab 318 is attached to each corresponding connection point 320 on the support segment 118S thereby forming the arc 214.

Each single blade element is then folded up sharply at the fold line 312 on the outer edge 115 of the small radius blade support 114, or may be bent softly forming a transition section 322 next to small radius blade support 114. The center reference points 316 of each support segment 118S are then all aligned with each other on an axis passing through the center of the small radius blade support 114. Then the large radius blade support segments 118S are attached to each other at the corresponding connection point 320.

FIG. 3B is bottom view of a large radius blade support 118 formed from the connected template sheet's 310 large radius support segments 118S. An eyelet 325 installed to serve as a bushing 116. The eyelet 325 is attached at each of the large radius blade support segments' 118S center reference point 316 to finish forming a rotor subassembly 110T.

Using the same template of FIG. 3A, a mirror image rotor subassembly 110B is formed by making folds in the opposite direction of the rotor subassembly 110T. The two rotor subassemblies 110T and 110B are rotated 30 degrees, from each other, about the axis, and are united by attachment of their two large radius blade supports 118T and 118B to each other at the alignment and attachment points 314.

Referring to FIG. 1—A hole is provided at the center of the small radius blade support 114B allowing the passage of a provided support rod 124 and shaft 122 with a retainer 120. The shaft is inserted into the bushings 116 to complete the any axis turbine pinwheel.

Description

Figure 4:
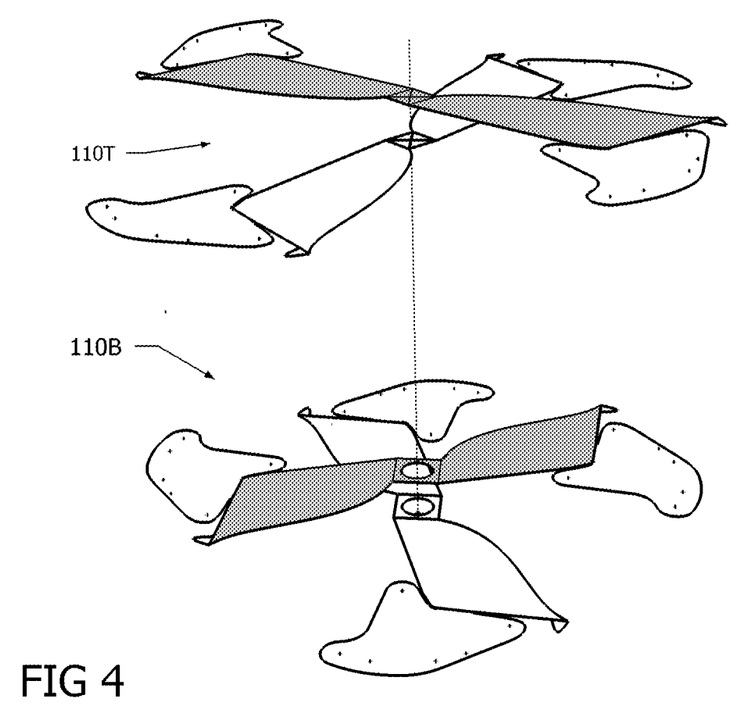
FIG. 4 is a perspective view two stacked templates for a shape similar to FIG. 3A.

Second Embodiment—FIG. 4

FIG. 4 illustrates templates for an egg shaped pinwheel for an array of blades to have alternating preprinted blade decor. Two templates are used for the top rotor subassembly 110T and two templates are used for the bottom rotor subassembly 110B for a pinwheel with a total of eight blades.

Conclusion, Ramifications, and Scope

It becomes apparent that at least one embodiment provides an inexpensive versatile pinwheel which can easily modified to take on variety of forms. Construction methods may be altered to best suit the materials being used. One example would be to use a common element as a large radius blade support 118 for both the rotor subassemblies 110T and 110B.

The number of blades 210 in each rotor subassembly 110 may be changed alter the appearance.

FIG. 5 thru FIG. 8 illustrates the shape of the spinning pinwheels.

Figure 5:
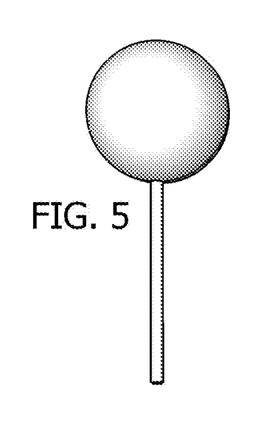
FIG. 5 is sphere shaped pinwheel.

FIG. 5 is a sphere or ball shape of the first embodiment.

Figure 6:
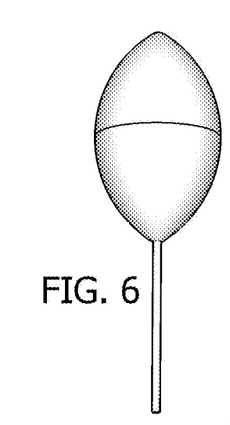
FIG. 6 is a football shaped pinwheel.

FIG. 6 illustrated a football shape created by a change in the ratio of height to radius H/R2 and modifying the outer edge 211 of the single blade elements 210.

Figure 7:
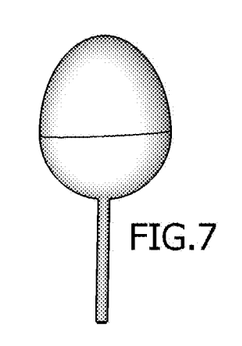
FIG. 7 is an egg shaped pinwheel.
Figure 8:
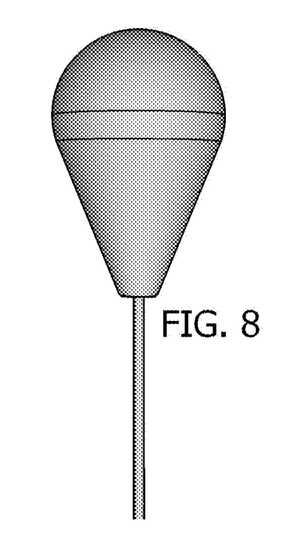
FIG. 8 is a hot air balloon shaped pinwheel.

FIGS. 7 and 8, illustrate an egg shape and a hot air balloon shape resulting from the rotor subassemblies 110 having the same radius but differing heights.

Figure 9:
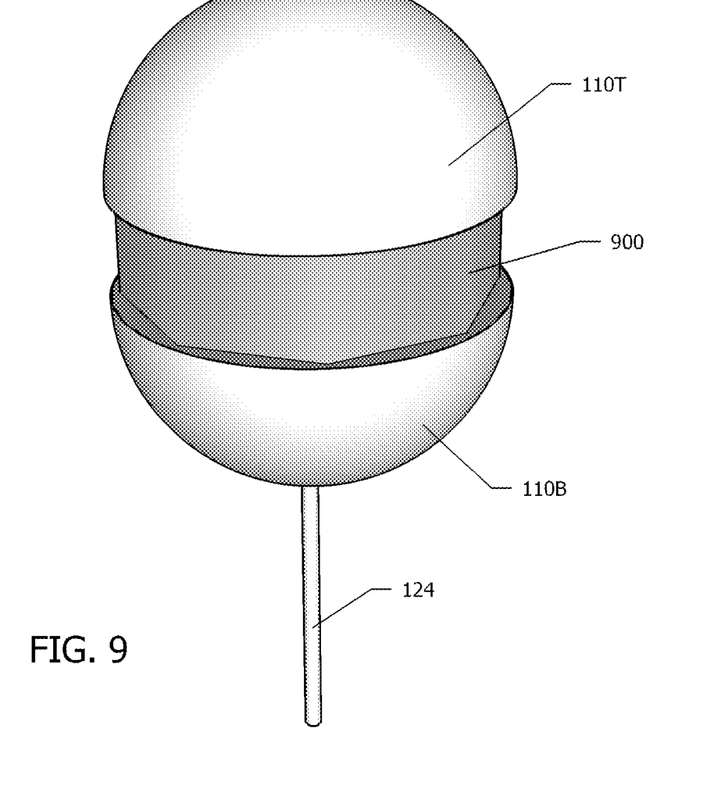
FIG. 9 is pinwheel with and section added between upper and lower subassemblies.

FIG. 9 illustrates a turbine assembly with the top rotor subassembly 110T and the bottom rotor subassembly 110B separated and additional section 900 added.

Because the pinwheels spin in any wind direction non-conventional supports may be used. An array of pinwheels stung along a cable to form a banner. The pinwheels may be allowed to spin independently or they may be attached to a cable with swivels at each end and spin as a unit.

The pinwheels also may be used as a prime movers, in the same way that propeller style turbine blades are used for powering whirligigs but having the advantage of not needing a tracking means to stay oriented into the wind.

Thus the scope of the embodiments should be determined by the appended claims, rather than by the examples given.

The invention claimed is:

1. A fluid driven turbine of the type comprising: a support, a rotor, and a bearing means for rotatably connecting said rotor to said support facilitating rotation about an axis,
   said rotor comprising: an outer perimeter, a plurality of blades, and a plurality of blades supports, wherein all said blade supports are perpendicular to the axis with at least one said blade support being connected to said bearing means, said blades being connected to said blade supports such that said blades are substantially parallel to the axis at said outer perimeter, said blades being shaped in a manner such that they react to fluid flows perpendicular to the axis causing said rotor to rotate about the axis,
   the improvement wherein said rotor, aligned on a vertical axis, comprises:
      a. a top rotor subassembly, comprising:
         a bottom blade support,
         a top blade support being smaller in diameter than said bottom blade support,
         each said blade having an outer section reacting to fluid flows perpendicular to the axis creating torque about the axis in a predetermined direction,
         each said blade having an inner section reacting to fluid flows from the top of said turbine, parallel to the axis, creating torque about the axis in the same said predetermined direction,
      b. a bottom rotor subassembly, comprising:
         an upper blade support, a lower blade support being smaller in diameter than said upper blade support, each said blade having an outer section reacting to fluid flows perpendicular to the axis creating torque about the axis in the same said predetermined direction, each said blade having an inner section reacting to fluid flows from the bottom of said turbine, parallel to the axis, creating torque about the axis in the same said predetermined direction, c. a fluid flow blocking means between said top rotor subassembly and said bottom rotor subassembly so as to keep fluid flows from the top of said turbine from reacting with said inner blade sections of said bottom rotor subassembly and so as to keep fluid flows from the bottom of said turbine from reacting with said inner blade sections of said top rotor subassembly, whereby fluid flows from any direction cause said rotor to rotate in said predetermined direction.

2. The fluid driven turbine of claim 1 wherein said bottom blade support of said top rotor subassembly is directly attached to, or is in common with, said top blade support of said bottom rotor subassembly.

3. The fluid driven turbine of claim 1 wherein said bottom blade support of said top rotor subassembly and said upper blade support of said bottom rotor subassembly are separated, along the axis, by an additional support means wherein additional elements may be placed.

* * * * *